(12) United States Patent
Ekambaram et al.

(10) Patent No.: US 11,010,782 B2
(45) Date of Patent: May 18, 2021

(54) PAYMENT FOR A SERVICE UTILIZING INFORMATION

(71) Applicant: International Business Machines Corporation, Armonk, NY (US)

(72) Inventors: Vijay Ekambaram, Chennai (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 840 days.

(21) Appl. No.: 14/885,126

(22) Filed: Oct. 16, 2015

(65) Prior Publication Data
US 2017/0109739 A1     Apr. 20, 2017

(51) Int. Cl.
*G06Q 30/02* (2012.01)
*G06Q 20/38* (2012.01)
(Continued)

(52) U.S. Cl.
CPC ....... *G06Q 30/0233* (2013.01); *G06Q 20/145* (2013.01); *G06Q 20/29* (2013.01);
(Continued)

(58) Field of Classification Search
CPC ............ G06Q 20/387; G06Q 30/0233; G06Q 20/401; G06Q 20/145; G06Q 20/29; G06Q 20/322
(Continued)

(56) References Cited

U.S. PATENT DOCUMENTS 6,016,476 A * 1/2000 Maes .................. G06Q 20/108
705/18
6,327,578 B1 * 12/2001 Linehan ................ G06Q 20/02
705/65
(Continued)

FOREIGN PATENT DOCUMENTS

WO     WO2005048152 A1     5/2005

OTHER PUBLICATIONS

Marvin Sirbu, J.D. Tygar; "NetBill: An Internet Commerce SystemOptimized for Network-Delivered Services"; Aug. 1995; file NetBill_An_Internet_Commerce_System.pdf (Year: 1995).*
(Continued)

*Primary Examiner* — Patrick McAtee
*Assistant Examiner* — Edgar R Martinez-Hernandez
(74) *Attorney, Agent, or Firm* — Ference & Associates, LLC

(57) ABSTRACT

A contemplated method includes: utilizing at least one processor to execute computer code that performs the steps of: receiving, from an application installed on the information handling device, a request to access a service provided by a service provider; providing, to the application, access to the requested service; and receiving, from the application, payment for provided access to the requested service, wherein information is received from the information handling device as a credit for at least a portion of the payment; the information being received via: sending, to the application, a context information request, wherein the context information request comprises a request for context information associated with the information handling device; sending, to the application, a request for information, wherein the request comprises at least one suggestion for information to be provided by the information handling device and wherein the at least one suggestion for informa-
(Continued)

tion is based on received context information; and receiving, from the application, the information. Other aspects are described and claimed.

17 Claims, 3 Drawing Sheets

(51) Int. Cl.
- *G06Q 20/40* (2012.01)
- *G06Q 20/22* (2012.01)
- *G06Q 20/14* (2012.01)
- *G06Q 20/32* (2012.01)

(52) U.S. Cl.
CPC ......... *G06Q 20/322* (2013.01); *G06Q 20/387* (2013.01); *G06Q 20/401* (2013.01)

(58) Field of Classification Search
USPC .......................................................... 705/64
See application file for complete search history.

(56) References Cited

U.S. PATENT DOCUMENTS

| | | | | |
|---|---|---|---|---|
| 6,984,210 | B2* | 1/2006 | Chambers | A61B 8/13 600/443 |
| 7,707,120 | B2* | 4/2010 | Dominguez | G06Q 20/02 705/78 |
| 8,032,412 | B2 | 10/2011 | Meinhardt | |
| 8,346,666 | B2* | 1/2013 | Lindelsee | G06Q 20/00 705/44 |
| 8,346,672 | B1* | 1/2013 | Weiner | H04W 12/06 705/75 |
| 8,712,914 | B2* | 4/2014 | Lyons | G06Q 20/0655 705/44 |
| 8,954,441 | B1* | 2/2015 | Baranov | G06F 16/9024 707/739 |
| 8,959,190 | B2* | 2/2015 | Kiley | H04L 67/306 709/220 |
| 9,092,777 | B1* | 7/2015 | Gaspar | G06Q 20/385 |
| 2004/0111379 | A1* | 6/2004 | Hicks | G06Q 20/02 705/76 |
| 2005/0138426 | A1* | 6/2005 | Styslinger | H04L 63/083 726/4 |
| 2007/0283142 | A1* | 12/2007 | Milstein | H04L 63/08 713/155 |
| 2009/0070262 | A1* | 3/2009 | Olliphant | G06Q 20/02 705/44 |
| 2009/0327150 | A1* | 12/2009 | Flake | G06Q 10/0637 705/80 |
| 2010/0088237 | A1* | 4/2010 | Wankmueller | G06Q 20/12 705/75 |
| 2010/0312789 | A1* | 12/2010 | Numakami | G06F 16/48 707/769 |
| 2011/0077949 | A1* | 3/2011 | Olliphant | G06Q 20/10 705/1.1 |
| 2013/0124422 | A1* | 5/2013 | Hubert | G06Q 20/3827 705/71 |
| 2014/0279556 | A1* | 9/2014 | Priebatsch | G06Q 20/322 705/67 |
| 2014/0288998 | A1* | 9/2014 | Paray | G06Q 20/29 705/7.29 |
| 2014/0289315 | A1* | 9/2014 | Harrison | H04L 67/42 709/203 |
| 2015/0181409 | A1* | 6/2015 | Chang | H04M 15/68 455/410 |
| 2016/0063318 | A1* | 3/2016 | Cheatham, III | G06K 9/00335 348/143 |
| 2017/0034248 | A1* | 2/2017 | Bals | G06Q 40/02 |

OTHER PUBLICATIONS

Shen Qunli, Lv Jiong; "Network Authentication Protocol Based on McroPayment Protocol"; file Network Authentication Protocol Based on McroPayment Protocol.pdf (Year: 2009).*

"Profit Models of Social Networking Service"; Liu Jia-yin; NPL—Profit Models of Social Networking Service.pdf; 2011 (Year: 2011).*

"An Analysis and Comparison of Different vpes of Electronic Payment Systems"; Zon-Yau Lee', Hsiao-Cheng Yu', Pei-Jen Kuo'; Jul. 29-Aug. 2, 2001; NPL—Different vpes of Electronic Payment Systems.pdf (Year: 2001).*

Reddy, Sasank, et al., "Examining Micro-Payments for Participatory Sensing Data Collections", UbiComp'10, Sep. 26-29, 2010, Copenhagen, Denmark, 4 pages, ACM Digital Library.

Zaypay, "Big in small payments", Zaypay.com, Accessed on Aug. 19, 2015, 3 pages, Copy available at: https://secure.zaypay.com/overview.

Herther, Nancy K., "Google, Apple Expand Micropayment Systems for Web Content and Mobile Purchasing", NewsBreaks, Posted on Oct. 22, 2012, Accessed on Aug. 19, 2015, 4 pages, Copy available at: http://newsbreaks.infotoday.com/NewsBreaks/Google-Apple-Expand-Micropayment-Systems-for-Web-Content-and-Mobile-Purchasing-85686.asp.

RT, "Google data collection worries Americans more than NSA", RT, Published on Oct. 30, 2014, Accessed on Aug. 19, 2015, 9 pages, Copy available at: http://www.rt.com/usa/200687-google-nsa-data-collection/.

Greenwald, Glenn et al., "NSA Prism program taps in to user data of Apple, Google and others", the Guardian, Jun. 7, 2013, Accessed on Aug. 19, 2015, Copy available at: http://www.theguardian.com/world/2013/jun/06/us-tech-giants-nsa-data.

Karame, Ghassan O. et al., "Pay as you Browse: Microcomputations as Micropayments in Web-based Services", WWW 2011, Mar. 28-Apr. 1, 2011, Hyderabad, India, 10 pages, ACM Digital Library.

Flacy, Mike, "Google Launches Micropayments Service for Web Content", Digital Trends, Oct. 2, 2012, Accessed on Sep. 2, 2015, 8 pages, Copy available at: http://www.digitaltrends.com/web/google-launches-micropayments-for-web-content/.

Karame, Ghassan O. et al., "Microcomputations as Micropayments in Web-based Services", ACM Transactions on Internet Technology, May 2014, 23 pages, vol. 13, No. 3, Article 8, ACM Digital Library.

Auletta, V. et al., "A Web Service Based Micro-payment System", Proceedings of the 11th IEEE Symposium on Computers and Communications (ISCC '06), Jun. 26-29, Pula-Cagliari, Sardinia, Italy, 6 pages, IEEE Digital Library.

* cited by examiner

PAYMENT FOR A SERVICE UTILIZING INFORMATION

BACKGROUND

In receiving payment for services (e.g., use of applications, use of networks, etc.) provided by a service provider, a service provider may use a variety of service payment models. The service provider may use the service payment model which best fits with the services provided by the service provider. For example, one type of service payment model is a prepaid payment model in which a user pays a single amount for use of a service for a specified time frame (e.g., days, months, etc.). An example of an application which may use a prepaid payment model is a cellular phone service provider. The cellular service provider may bill the user for use of a service for the upcoming month.

Another type of service payment model is a postpaid payment model in which a user uses a service and then receives a bill for the time period or amount of the service used. An example of an application which may use a postpaid payment model is a utility service provider. The utility service provider may bill a user for use of a service for the month preceding the bill. An additional type of service payment model is a micropayment model in which a user pays a very small amount for one or a few service requests and then receives access to the service. An example of an application which may use a micropayment model is an application provider. When a user wants to use the application, the service provider may bill the user for a specified number of uses of the service. After paying the bill the user may gain access to the service.

BRIEF SUMMARY

In summary, one aspect of the invention provides a method of utilizing information captured by an information handling device to provide payment for a service, the method comprising: utilizing at least one processor to execute computer code that performs the steps of: receiving, from an application installed on the information handling device, a request to access a service provided by a service provider; providing, to the application, access to the requested service; and receiving, from the application, payment for provided access to the requested service, wherein information is received from the information handling device as a credit for at least a portion of the payment; the information being received via: sending, to the application, a context information request, wherein the context information request comprises a request for context information associated with the information handling device; sending, to the application, a request for information, wherein the request comprises at least one suggestion for information to be provided by the information handling device and wherein the at least one suggestion for information is based on received context information; and receiving, from the application, the information.

Another aspect of the invention provides an apparatus for utilizing information captured by an information handling device to provide payment for a service, the apparatus comprising: at least one processor; and a computer readable storage medium having computer readable program code embodied therewith and executable by the at least one processor, the computer readable program code comprising: computer readable program code that receives, from an application installed on the information handling device, a request to access a service provided by a service provider; computer readable program code that provides, to the application, access to the requested service; and computer readable program code that receives, from the application, payment for provided access to the requested service, wherein information is received from the information handling device as a credit for at least a portion of the payment; the information being received via: sending, to the application, a context information request, wherein the context information request comprises a request for context information associated with the information handling device; sending, to the application, a request for information, wherein the request comprises at least one suggestion for information to be provided by the information handling device and wherein the at least one suggestion for information is based on received context information; and receiving, from the application, the information.

An additional aspect of the invention provides a computer program product for utilizing information captured by an information handling device to provide payment for a service, the computer program product comprising: a computer readable storage medium having computer readable program code embodied therewith, the computer readable program code comprising: computer readable program code that receives, from an application installed on the information handling device, a request to access a service provided by a service provider; computer readable program code that provides, to the application, access to the requested service; and computer readable program code that receives, from the application, payment for provided access to the requested service, wherein information is received from the information handling device as a credit for at least a portion of the payment; the information being received via: sending, to the application, a context information request, wherein the context information request comprises a request for context information associated with the information handling device; sending, to the application, a request for information, wherein the request comprises at least one suggestion for information to be provided by the information handling device and wherein the at least one suggestion for information is based on received context information; and receiving, from the application, the information.

A further aspect of the invention provides a method of securely obtaining information captured by an information handling device, said method comprising: utilizing at least one processor to execute computer code that performs the steps of: sending, to an application installed on an information handling device, an encrypted context information request, wherein the context information request comprises a request for context information associated with the information handling device; receiving, from the application, an encrypted context information response comprising context information associated with at least one characteristic of the information handling device, wherein the context information comprises context information received by the application from a data collection program installed on the information handling device; identifying, based on the received context information, possible information that can be captured at the information handling device; sending, to the application, a request for information, wherein the request comprises at least one suggestion for information to be provided by the data collection program and wherein the suggestion for information is based on the identified possible information; and receiving, from the application, information comprising information received by the application from the data collection program via a covert channel, wherein the covert channel is created between the application and data collection program based on a user permission comprising a defined time.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
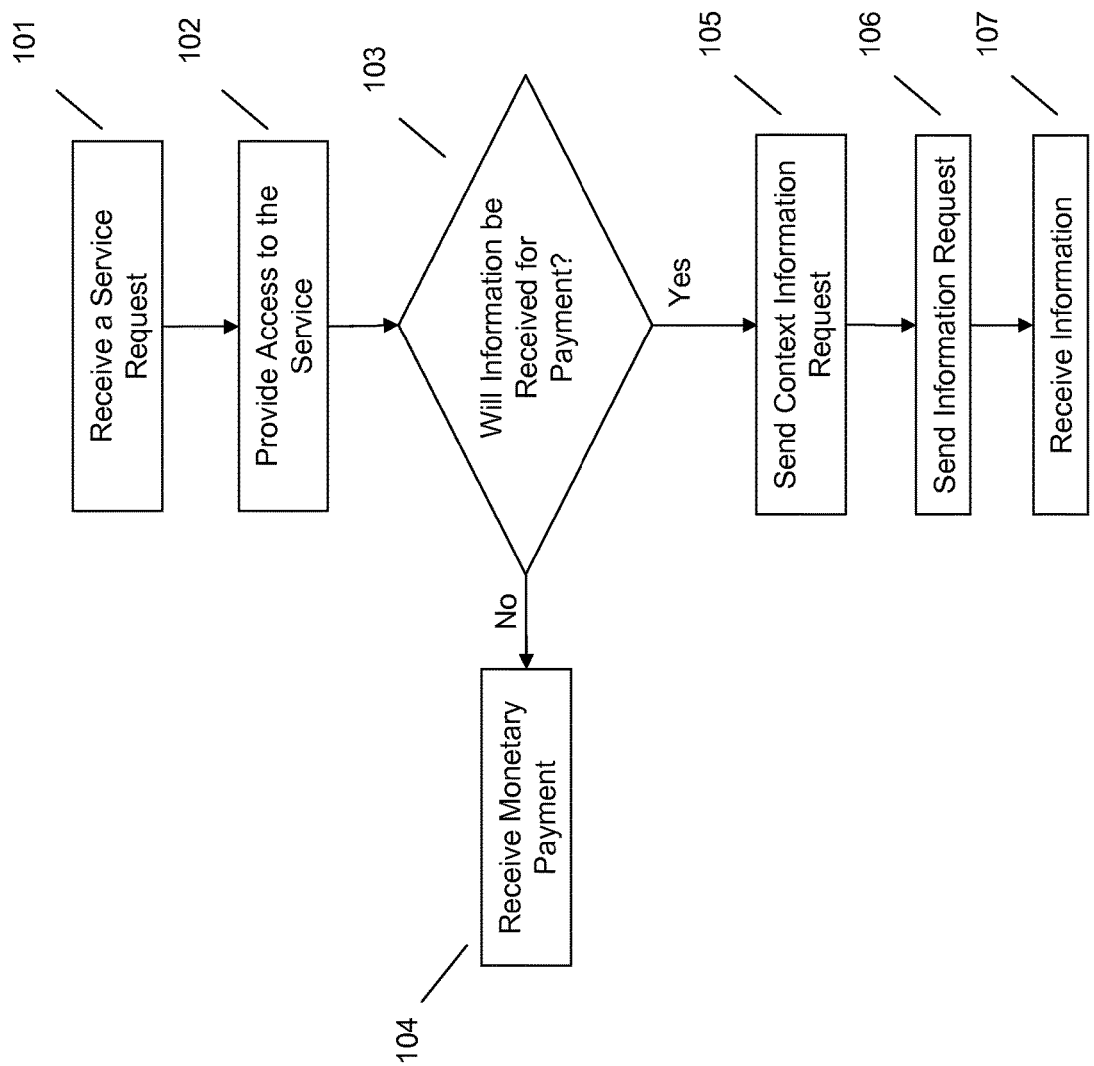
FIG. 1 illustrates an example method of payment for a service utilizing information.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

A popular type of service payment model, for service providers requiring small payments for use of a service, is a micropayment model. For example, this type of payment model is a popular choice for web service providers. Currently, in such micropayment models, a user provides payment for one or a few service requests and then gets access to the service. If more service requests are needed, the user can dynamically pay for the additional service requests.

For ease of understanding, an example of a mobile application developer will be used. However, as can be understood by one skilled in the art, the use of embodiments as described herein can be used in other applications and systems. For example, an application requesting data for personalizing advertisements may use embodiments as described herein to securely access the requested information using a single source. This also provides a way to gather the information using a single permission set. In other words, the user only has to provide permission to a single source to collect information rather than providing permission to multiple applications.

The example that will be used throughout this application is one of a developer of a mobile application, which allows users to purchase products or services, needing use a shopping cart. Rather than writing the code for the shopping cart mechanism, the application developer may request the use of a shopping cart mechanism from a service provider that already has the code. To use the shopping cart mechanism, the service provider may request a lump-sum payment up front. The mobile application developer may not have the amount of money requested by the service provider, so the mobile application developer and service provider may enter into an agreement which allows the mobile application developer to pay a small amount for a number of uses of the shopping cart mechanism. For example, the mobile application developer may pay $0.01 for each use of the shopping cart mechanism and may pay for a number of uses up-front. As the users of the mobile application access the shopping cart mechanism, the mobile application developer purchases uses of the shopping cart mechanism, from the service provider, for $0.01 each. This is a typical micropayment service model.

One of the problems with such a model is that the application developer still has to provide money up-front to the service provider to get access to the service. Needing access to the service generally comes before the launch of the application, and the mobile application developer may not have the funds available to pay the reduced amount. One way that the mobile application developer may raise the amount necessary to pay the service provider is to charge a higher amount to users as they download the application. In other words, the cost for use of the shopping cart mechanism of the example above is passed to the users even if they do not end up purchasing any products or services. The increase in the cost of downloading the application may deter some users from downloading or using the application. If a reduced number of users download the application, the service provider may not end up recouping the costs of allowing the developer to use the services of the service provider. Additionally, if the developer knows the cost of downloading the application is going to be too great to users, the developer may be less likely to launch the application.

Accordingly, an embodiment provides a method of utilizing information captured from a user's information handling device as payment to a service provider for use of a service. In an embodiment the service provider and the developer agree that if the developer can provide information from users' information handling devices, the service provider will allow access to the service at a reduced rate. Accordingly, in one embodiment, the service provider receives a request from an application installed on an information handling device to access a service provided by the service provider. The service provider may then provide access to the service, based upon the agreement, before receipt of payment. After providing access to the service, the service provider may then receive payment for the requested service in the form of information captured from an information handling device ("device") which the mobile application is installed on.

In order to capture the information, the service provider may send a context information request to the application to gather information associated with the information handling device. After identifying the context information an embodiment may send an information request and then gather the information from the information handling device to be used as at least partial payment for the service. At a later time, the service provider may then use or sell the information collected from the information handling device to recoup some of the costs of providing the service to the developer for a reduced rate. In allowing the developer to use information collected from a user's information handling device as payment for the service provided by the service provider, the cost of developing the application is greatly reduced for the developer. Additionally, because the cost of developing the application is reduced, the cost of the application to users is also reduced, thereby allowing the developer to sell to a larger audience, which may allow the service provider to capture information associated with the larger audience.

Referring now to FIG. 1, an embodiment may receive a request from an application installed on an information handling device to access a service provided by a service provider at 101. An example of such a request may include a registration request. If the service provider and application developer have entered into an agreement whereby the application developer will provide information in lieu of payment, when the user launches the application on their device, the user may be prompted by the mobile application to install a data collection program. A data collection program may be utilized to securely capture information from the information handling device. In using a single data collection program, the user of the application only needs to trust a single source for data collection. In other words, the user does not have to trust all applications which may access the service provider, but instead just has to trust the single data collection program. Additional details of the data collection program are provided below.

The request to install the data collection program may be a one-time request. In other words, if the user has already installed the data collection program on their device the user may not be prompted to install it every time an application is launched. Additionally, if the service provider has entered into agreement with multiple application developers, the user may only have to install the data collection program once per service provider. As an example, if the service provider provides services for five applications, the user will only have to install one data collection program that will interact with all five applications.

At 102, an embodiment may provide access to the requested service to the application. Access may be provided if the service provider and application have agreed that information will be provided as payment, for example as outlined below. Access allowance may occur before receipt of payment by the service provider. For example, contrary to typically micropayment service models where a service provider receives payment before allowing access to a service, in a model, such as outlined in some embodiments, a service provider may allow payment of the service to go temporarily unpaid or partially unpaid. An embodiment, at 103, determines whether information can or will be received in lieu of a monetary payment by the application developer. If information cannot be received, for example, the user refuses to download the data collection program, an embodiment then reverts to a typical micropayment model and receives a monetary payment from the application at 104. If, however, an embodiment identifies that information can and will be received at 103, an embodiment may receive at least a partial payment in the form of information from the device on which the application is installed.

To set up the agreement to receive information in lieu of a monetary payment, an embodiment may perform steps to ensure a secure and private exchange of information. An embodiment may send a context information request to the application at 105. In one embodiment this context information request may be an encrypted request. Using encrypted communications ensures that the application(s) cannot access and use the collected information. The context information request may include a request for information associated with the information handling device. For example, in one embodiment the context information may be associated with a characteristic of the information handling device, as discussed in more detail below. In one embodiment the context information request may be sent from the application to the data collection program. The data collection program may register the application and then identify the current context information of the device.

In identifying the context information, the data collection program may access a variety of sources on, within, and/or accessible by the device to collect context information (e.g., hardware information, network information, sensor information, etc.). The context information may include metadata, location of the device, user activities associated with the device, user history, time, connection type (e.g., wireless, wired, etc.), information regarding the connection (e.g., network name, network location, network strength, etc.), and the like. Upon collecting or identifying the context information, the data collection program may send a context response to the application, which then forwards the context response to the service provider. The context response from the data collection program may be an encrypted response.

The service provider initially takes a context packet containing a sample of all available data to ascertain which data are most useful. In other words, the service provider uses the context information to determine what type of information can be provided by the device. In determining the kind of information that can be provided, the service provider may also estimate the type of information, the periodicity of the information, the duration of the information, and other similar information. Not only does the context packet sampling help identify the type of information that can be provided by the device, but the context packet sampling also ensures that the service provider receives new information. For example, if the service provider is in communication with multiple applications, the context packet sampling ensures that the information received through one application is not the same as the information received from another application.

The service provider also identifies a possible value of the information that can be received. As an example, the service provider may identify from the context information that the user frequents a particular website providing shoes. This information may be valuable to an advertiser who may use this information to personalize advertisements based upon the user history. However, this information may not be as valuable as information regarding the route patterns of the user which may be used by multiple entities for different purposes. For example, a traffic application may use the information to identify if there is heavy traffic at a particular time of day and an advertiser may use the information to provide targeted advertising for stores near the user at a particular time.

After determining the type of information that may be provided and an estimated value, an embodiment may send a request for information at 106 to the application. The request for information may include at least one suggestion for information to be provided or captured from the information handling device. This suggestion may be based upon the context information received. For example, using the context information an embodiment may suggest information to be obtained from the information handling device. Additionally, the suggestion may be based on the type of information determined above and the identified value of the information. For example, an embodiment may send a request for information containing a suggestion to obtain the most valuable information from the device. The request may include a single suggestion for information or may include multiple suggestions for information. In the case of multiple suggestions, the suggestions may be ranked. For example, the request may contain suggestions and delineate which suggestions are more desirable than other suggestions.

The application may forward the request for information to the data collection program. The data collection program may use the suggestion(s) to identify the best information to provide. In identifying the information to be provided the data collection program may use different criteria. For example, the data collection program may obtain the information which is most easily accessible. The data collection program may also take into account different characteristics of the device in identifying which information to provide. For example, the data collection program may identify processing requirements, power levels, previously provided information, and the like, in identifying which information to provide. To ensure that the data collection program does not misuse the information from the information handling device, the data collection program is unable to communicate with a third-party server (e.g., the data collection program does not have internet permissions), and instead has to gather the information from the information handling device. This also ensures that the information is valid and not created by the data collection program.

Once the data collection program has identified which information will be provided, the data collection program may indicate to the application that information has been selected. Upon receiving this indication, the application may request user permission to create a covert-channel between the application and data collection program. The covert-channel creates a capability to transfer information objects between the application and data collection program when the application would not normally be allowed to access the information objects. The request for permission may include what information the application will be accessing (e.g., location information, network information, user history, etc.). Additionally, the permission request may include how long the application will have access to the information and how often the application will access the information. The permission request prompt may be provided every time the data collection program wants to provide information to the application. Alternatively, the permission request prompt may only be provided once. For example, a user may set the prompt to remember the selection for future uses.

The application may then notify the service provider that access has been granted to provide information from the data collection program to the service provider through the application. The notification may also include the amount of information to be provided, the timeframe for which the information can be provided, how often the information can be provided, and other such information. At this point, the agreement to provide information in exchange for access to requested services is in place.

The service provider may allow the application to access the requested services, for example, at 102. In other words, once the service provider has an indication that information can and will be provided, the service provider may grant access for future uses to the services requested by the application. The service provider may continue to allow access to the services requested as long as the application shares the requested data periodically as agreed.

At 107, an embodiment may receive the identified information from the application. As previously discussed, this information may be received by the application from the data collection program via a covert channel. The information may also be sent via an encrypted method. For example, the service provider and data collection program may have a pre-shared key that is used to encrypt/decrypt the information packet. The application does not have access to the key, so the application cannot access and misuse the information. To ensure that the data collection program does not continually send the same information, the information response may include a sequence number. New information will have a new sequence number. The service provider may then identify that the sequence number is different from previously received sequence numbers. Upon receipt of the information, an embodiment may identify the payment for the services accessed as received or discounted. The amount of payment identified as received may be based on the identified value of the information.

Using this same mechanism, an embodiment may obtain credits for information provided to the service provider. For example, if the application provides information before requesting access to a service, the service provider may provide credits for future uses. As an example, the data collection program may identify that current information that could be obtained from the device is very valuable even though there is currently no request to access a service from the service provider. The data collection program could contact the application and send the information to the service provider through the application. The service provider may then provide credits for this highly valuable information. These credits may be stored by the service provider or may alternatively be stored by the data collection program. If the credits are stored by the data collection program, when the service provider requests information, the data collection program may provide the credits rather than the information. The data collection program may make the decision to provide the credits when the information that can be provided is not valuable to the service provider.

Using the methods as described herein can be applied to additional business models and not just limited to service payment models. For example, an entity that needs information to personalize ads may provide a collection program to gather information. The covert channel creation and encrypted communications, as described herein, would allow the entity to capture the required information without having to request permission from the user every time information is desired or requested.

Figure 2:
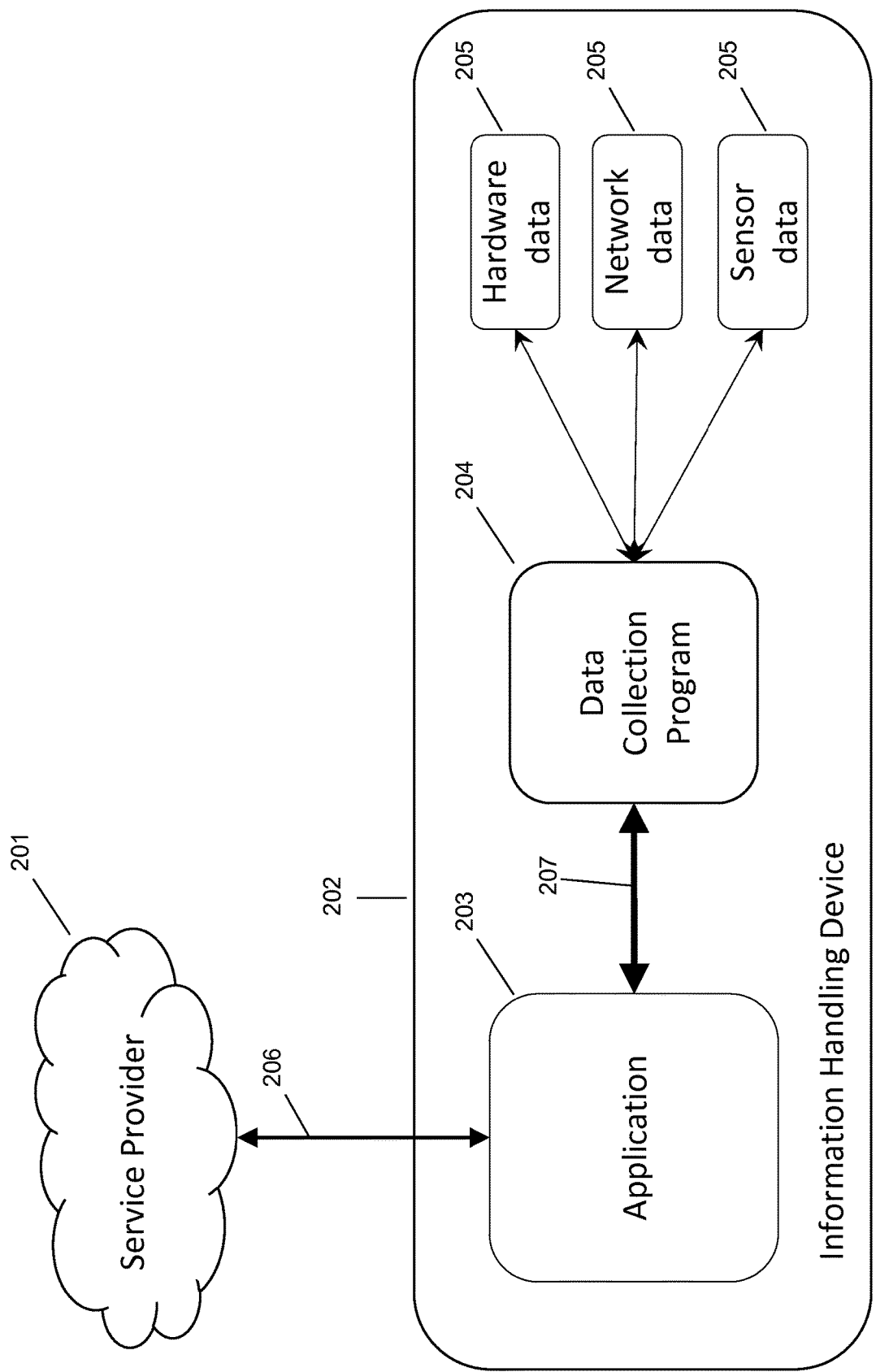
FIG. 2 illustrates a communication diagram for payment for a service utilizing information.

FIG. 2 shows an example communication structure of the different entities. Service provider 201 communicates with application 203, installed on an information handling device 202, over a communication channel 206. The communication over this channel 206 may be encrypted to provide a more secure communication. Application 203 communicates with data collection program 204, also installed on information handling device 202, over communication channel 207. This communication channel 207 may initially be a common channel. Before sending and/or receiving information that application 203 does not have direct permission to obtain, the communication channel 207 may be converted to a covert-channel. A covert-channel is a specific technique used by an application, in which the application can obtain information that it does not have permission to get from other application or programs that do have permission to obtain the information. Data collection program 204 may communicate with sources 205 (e.g., hardware data sources, network data sources, sensor data sources, etc.) on information handling device 202 to obtain both context information and requested information. In some embodiments, data collection program 204 may communication directly with service provider 201. This type of communication may be dependent on the trust model and/or agreement between the data collection program and the application developer.

Figure 3:
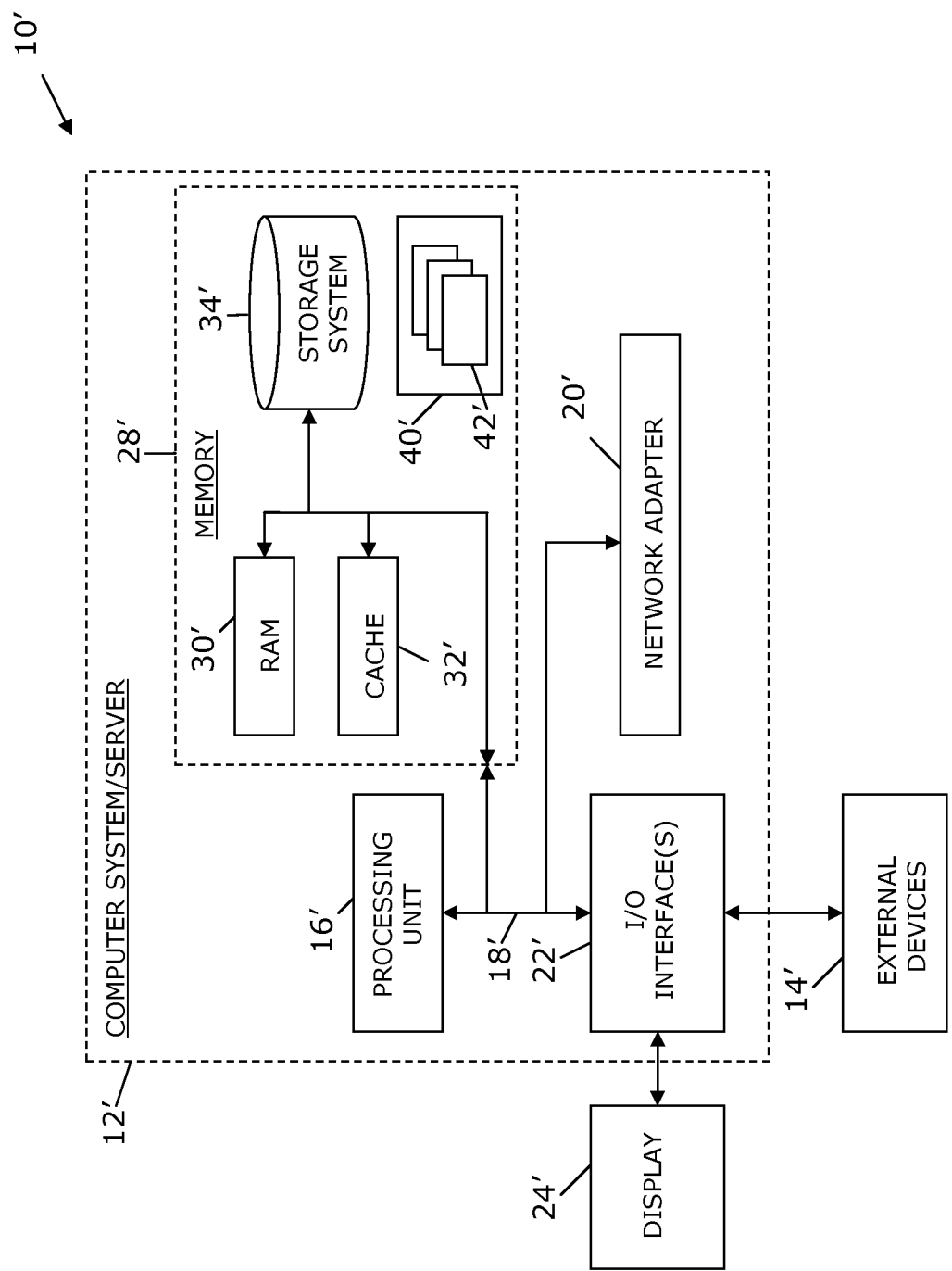
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of securely obtaining information captured by an information handling device, the method comprising:
receiving, from an application provided by an application provider and installed on the information handling device of a user, a request to access a service within the application and provided by a service provider, wherein the service comprises a component of the application for operation of the application, wherein the application provider provides payment to the service provider for use of the service within the application;

providing, from the service provider and to the application, access to the requested service, wherein the access to the requested service occurs before receipt of a payment to the service provider from the application provider; and receiving, at the service provider and from the application provider, payment for providing access to the requested service, wherein, responsive to receiving permission from the user accessing the application, the permission allowing for transmitting information from the information handling device of the user, receiving information regarding the user from the information handling device as a credit for at least a portion of the payment to be made by the application provider;

the information being received via:

sending, from the application to a data collection program installed on the information handling device and associated with the service provider, a context information request, wherein the context information request comprises a request for context information associated with the information handling device;

receiving permission from the user for transmitting context information from the information handling device to the service provider via the data collection program, wherein the context information comprises a context packet comprising a sample of data available from the information handling device;

sending, responsive to receiving a request from the data collection program, from the service provider to the application, a request for context information, wherein the request comprises at least one suggestion for context information to be provided by the information handling device and wherein the at least one suggestion for the context information is based on the context information transmitted in response to receiving the permission from the user;

creating a covert-channel between the application and the data collection program, wherein the covert-channel transfers application inaccessible information objects between the application and the data collection program, wherein the application inaccessible information objects comprise information objects of the information handling device the application cannot access without the permission from the user; and receiving, at the service provider from the application responsive to the application receiving the context information from the data collection program, the context information via the covert-channel.

2. The method of claim 1, wherein the information being received from the information handling device further comprises identifying a value of the received information.

3. The method of claim 2, wherein the at least a portion of the payment credited as received via received information is based on the identified value of the received information.

4. The method of claim 1, wherein the information being received from the information handling device further comprises receiving, from the application, a context information response comprising context information associated with at least one characteristic of the information handling device.

5. The method of claim 4, wherein the context information comprises context information received by the application from the data collection program installed on the information handling device.

6. The method of claim 4, wherein the context information comprises context information associated with at least one characteristic of the information handling device.

7. The method of claim 6, wherein the at least one characteristic is at least one of: user history, location, a user activity, time, and connection.

8. The method of claim 1, wherein the information being received from the information handling device further comprises identifying possible information that can be captured at the information handling device; and wherein the at least one suggestion for information is further based on the identified possible information.

9. The method of claim 1, wherein the context information request comprises an encrypted context information request.

10. An apparatus for securely obtaining information captured by an information handling device, the apparatus comprising:

a data collection program of the apparatus;

a digital service provided by a service provider at an application of the apparatus;

at least one processor; and a computer readable storage medium operatively coupled to the at least one processor and having computer readable program code embodied therewith and executable by the at least one processor, the computer readable program code comprising:

computer readable program code configured to receive, from an application provided by an application provider and installed on the information handling device of a user, a request to access the service within the application and provided by a service provider, wherein the service comprises a component of the application for operation of the application, wherein the application provider provides payment to the service provider for use of the service within the application;

computer readable program code configured to provide, from the service provider and to the application, access to the requested service, wherein the access to the requested service occurs before receipt of a payment to the service provider from the application provider; and computer readable program code configured to receive, at the service provider and from the application provider, payment for providing access to the requested service, wherein, responsive to receiving permission from the user accessing the application, the permission allowing for transmitting information from the information handling device of the user, sending a request to install the data collection program and receiving, via the data collection program, information regarding the user from the information handling device as a credit for at least a portion of the payment to be made by the application provider;

the information being received via:

sending, from application to a data collection program installed on the information handling device and associated with the service provider, a context information request, wherein the context information request comprises a request for context information associated with the information handling device;

receiving permission from the user for transmitting context information from the information handling device to the service provider via the data collection program, wherein the context information comprises a context packet comprising a sample of data available from the information handling device;

sending, responsive to receiving a request from the data collection program, from the service provider via the data collection program and to the application, a request for context information, wherein the request comprises at least one suggestion for context information to be provided by the information handling device and wherein the at least one suggestion for the context information is based on the context information transmitted in response to receiving the permission from the user;

creating a covert-channel between the application and the data collection program, wherein the covert-channel transfers application inaccessible information objects between the application and the data collection program, wherein the application inaccessible information objects comprise information objects of the information handling device the application cannot access without the permission from the user; and receiving, at the service provider and from the application responsive to the application receiving the context information from the data collection program, the context information via the covert-channel.

11. A computer program product for securely obtaining information captured by an information handling device, the computer program product comprising:

a computer readable storage medium operatively coupled to at least one processor and having computer readable program code embodied therewith, the computer readable program code executable by a processor and comprising:

computer readable program code configured to receive, from an application provided by an application provider and installed on the information handling device of a user, a request to access the service within the application and provided by a service provider, wherein the service comprises a component of the application for operation of the application, wherein the application provider provides payment to the service provider for use of the service within the application;

computer readable program code configured to provide, from the service provider and to the application, access to the requested service, wherein the access to the requested service occurs before receipt of a payment to the service provider from the application provider; and computer readable program code configured to receive, at the service provider and from the application provider, payment for providing access to the requested service, wherein, responsive to receiving permission from the user accessing the application, the permission allowing for transmitting information from the information handling device of the user, sending a request to install the data collection program and receiving, via the data collection program, information regarding the user from the information handling device as a credit for at least a portion of the payment to be made by the application provider;

the information being received via:

sending, from application to a data collection program installed on the information handling device and associated with the service provider, a context information request, wherein the context information request comprises a request for context information associated with the information handling device;

receiving permission from the user for transmitting context information from the information handling device to the service provider via the data collection program, wherein the context information comprises a context packet comprising a sample of data available from the information handling device;

sending, responsive to receiving a request from the data collection program, from the service provider via the data collection program and to the application, a request for context information, wherein the request comprises at least one suggestion for context information to be provided by the information handling device and wherein the at least one suggestion for the context information is based on the context information transmitted in response to receiving the permission from the user;

creating a covert-channel between the application and the data collection program, wherein the covert-channel transfers application inaccessible information objects between the application and the data collection program, wherein the application inaccessible information objects comprise information objects of the information handling device the application cannot access without the permission from the user; and receiving, at the service provider and from the application responsive to the application receiving the context information from the data collection program, the context information via the covert-channel.

12. The computer program product of claim 11, wherein the information being received from the information handling device further comprises identifying a value of the received information and wherein the at least a portion of the payment credited as received via received information is based on the identified value of the received information.

13. The computer program product of claim 11, wherein the information being received from the information handling device further comprises receiving, from the application, a context information response comprising context information associated with at least one characteristic of the information handling device.

14. The computer program product of claim 13, wherein the context information comprises context information received by the application from the data collection program installed on the information handling device.

15. The computer program product of claim 13, wherein the context information comprises context information associated with at least one characteristic of the information handling device.

16. The computer program product of claim 15, wherein the at least one characteristic is at least one of: user history, location, a user activity, time, and connection.

17. The computer program product of claim 11, wherein the information being received from the information handling device further comprises identifying possible information that can be captured at the information handling device; and wherein the at least one suggestion for information is further based on the identified possible information.

* * * * *